United States Patent
Hundt

(10) Patent No.: US 9,292,709 B1
(45) Date of Patent: Mar. 22, 2016

(54) COMPUTING A CHECKSUM FOR CONTENT IN LOCAL STORAGE

(71) Applicant: GOOGLE INC., Mountain View, CA (US)

(72) Inventor: Robert Hundt, Piedmont, CA (US)

(73) Assignee: GOOGLE INC., Mountain View, CA (US)

( * ) Notice: Subject to any disclaimer, the term of this patent is extended or adjusted under 35 U.S.C. 154(b) by 145 days.

(21) Appl. No.: 13/759,890

(22) Filed: Feb. 5, 2013

(51) Int. Cl.
   *G06F 7/04* (2006.01)
   *G06F 21/64* (2013.01)

(52) U.S. Cl.
   CPC ..................................... *G06F 21/64* (2013.01)

(58) Field of Classification Search
   CPC ........................................................ G06F 21/64
   USPC .......................................................... 726/26
   See application file for complete search history.

(56) References Cited

U.S. PATENT DOCUMENTS

| | | | |
|---|---|---|---|
| 2005/0198332 A1* | 9/2005 | Laertz et al. | 709/229 |
| 2008/0249798 A1* | 10/2008 | Tulshibagwale | 705/1 |
| 2010/0131359 A1* | 5/2010 | Ting et al. | 705/14.47 |
| 2010/0169795 A1* | 7/2010 | Hyndman et al. | 715/757 |
| 2010/0257230 A1* | 10/2010 | Kroeger et al. | 709/203 |
| 2011/0265077 A1* | 10/2011 | Collison et al. | 717/172 |
| 2011/0296179 A1* | 12/2011 | Templin et al. | 713/168 |
| 2012/0198234 A1* | 8/2012 | Chung et al. | 713/171 |
| 2013/0318056 A1* | 11/2013 | Lekies et al. | 707/697 |

* cited by examiner

*Primary Examiner* — Mohammad W Reza
(74) *Attorney, Agent, or Firm* — McDermott Will & Emery LLP

(57) ABSTRACT

Systems and methods for computing a checksum are provided. In some aspects, an online application code module is written in a first programming language. The online application code module is configured to implement an online application. A checksum compute module is written in a second programming language different from the first programming language. The checksum compute module is separate from the online application code module. The checksum compute module configured to receive one or more parameters from the online application code module. The checksum compute module configured to determine a checksum for the online application code module based on the received one or more parameters. The checksum compute module configured to provide the checksum to a memory.

18 Claims, 3 Drawing Sheets

COMPUTING A CHECKSUM FOR CONTENT IN LOCAL STORAGE

BACKGROUND

The subject technology generally relates to data security and authentication and, in particular, relates to computing a checksum for content in local storage.

Web browsers are often used to run online applications (e.g., electronic messaging applications, calendar applications, document management applications, mapping applications, social networking applications, etc.) via webpages. Each online application may be associated with JavaScript code that may occasionally be updated by a server for the online application.

SUMMARY

In some aspects, the disclosed subject matter relates to a system for computing a checksum. The system includes an online application code module written in a first programming language. The online application code module is configured to implement an online application. The system includes a checksum compute module written in a second programming language different from the first programming language. The checksum compute module is separate from the online application code module. The checksum compute module is configured to receive one or more parameters from the online application code module. The checksum compute module is configured to determine a checksum for the online application code module based on the received one or more parameters. The checksum compute module is configured to provide the checksum to a memory.

In some aspects, the disclosed subject matter relates to a computer-implemented method for computing a checksum. The method includes receiving one or more parameters of a module within an application. The application is written in a first programming language. The method includes determining, via execution of software code written in the first programming language, a checksum for the module based on the received one or more parameters. The method includes providing the checksum to a memory.

In some aspects, the disclosed subject matter relates to a computer-readable medium encoded with executable instructions for computing a checksum. The instructions include code for receiving one or more parameters of a module within an application. The application is written in software code. The instructions include code for determining, via execution of the software code of the application, a checksum for the module based on the received one or more parameters. The instructions include code for providing the checksum to a memory.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Features of the subject technology are set forth in the appended claims. However, for purpose of explanation, several aspects of the disclosed subject matter are set forth in the following figures.

DETAILED DESCRIPTION

Figure 1:
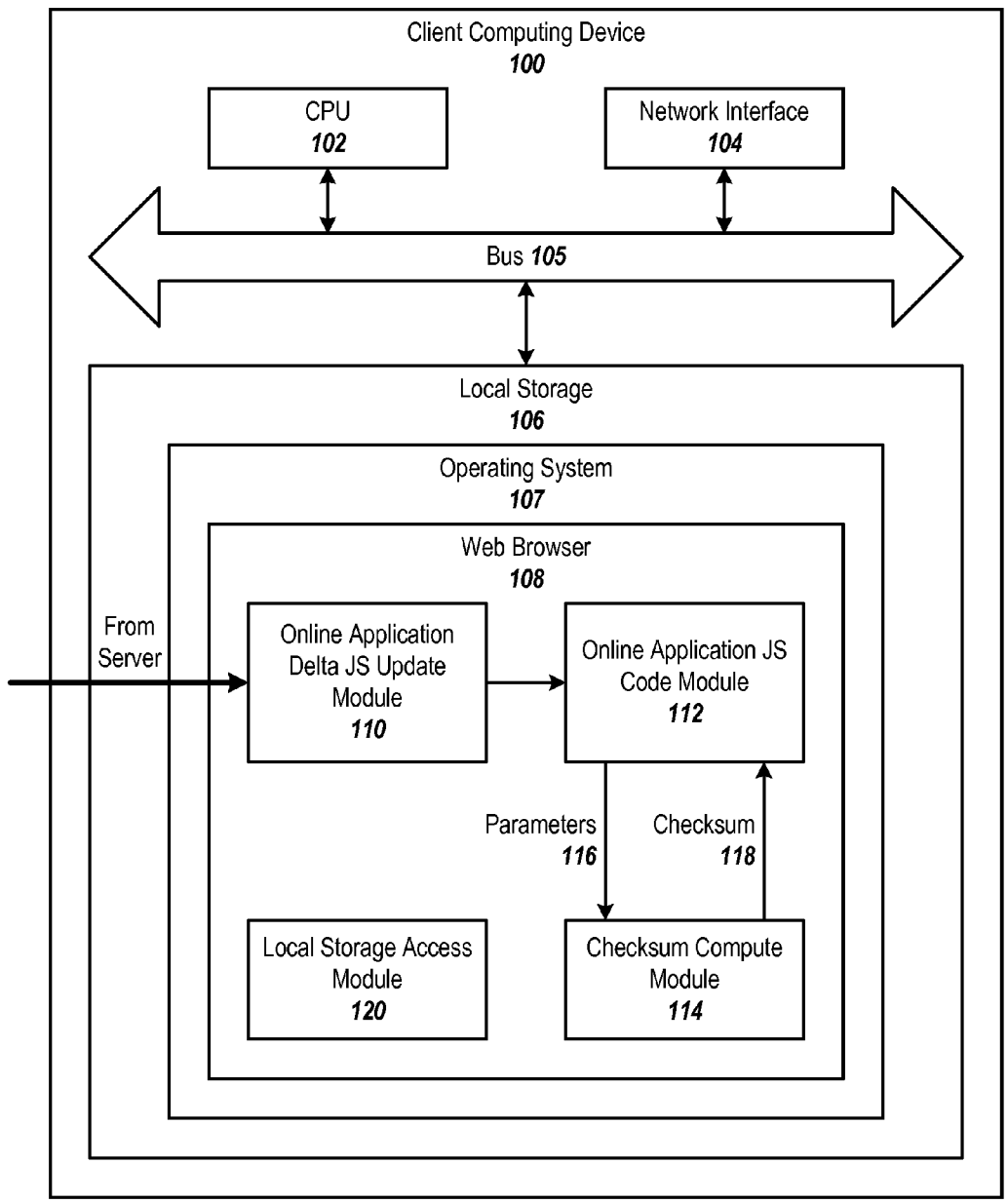
FIG. 1 illustrates an example client computing device configured to compute a checksum for content in local storage.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent that the subject technology is not limited to the specific details set forth herein and may be practiced without these specific details. In some instances, structures and components are shown in block diagram form in order to avoid obscuring the concepts of the subject technology.

Some aspects of the subject technology are described here in conjunction with a web browser executing online applications with JavaScript code. However, the subject technology can be used with any local application (e.g., a mobile phone application) residing on a client computing device, not necessarily a web browser. Also, the online applications may executed code in any programming language or scripting language, not necessarily JavaScript. In some aspects, a module within a local application that includes either software code or data that is not software code may be used in place of the online application.

In some implementations, the web browser downloads all of the code for an online application each time the application is executed. However, such downloading may take a significant amount of time (e.g., 10 seconds, 30 seconds, one minute, or two minutes), especially if the web browser has a slow network connection.

In some implementations, the web browser stores the JavaScript code for the online application in local storage (e.g., Hypertext Markup Language 5 (HTML5) local storage) and accesses or updates the code when the online application is executed. In these implementations, the web browser should verify that the JavaScript code for the online application is authentic and has not been tampered with by the user or by a third party (e.g., by a hacker or a malicious entity). In order to verify the authenticity and lack of tampering of the JavaScript code for the online application, the web browser computes a checksum for the JavaScript code based on data bits in the JavaScript code. The checksum is typically computed via JavaScript code residing on the web browser. However, JavaScript code is not well adapted for accessing bits and computing checksums. As a result, computing the checksum in this manner may take a significant amount of time (e.g., 10 seconds, 30 seconds, one minute, or two minutes), especially if the web browser resides on a thin client computing device or a client computing device with limited local processing power. As the foregoing illustrates, a new approach for computing a checksum for JavaScript code of an online application stored locally on a web browser may be desirable.

The subject technology provides techniques for computing a checksum for JavaScript code of an online application stored locally in a web browser. In some aspects, a web browser includes an online application code module written in JavaScript. The online application code module is configured to implement an online application (e.g., an electronic messaging application) that can be accessed via a webpage (e.g., www.email.com). The web browser also includes a checksum compute module. The checksum compute module is written in the same programming language as the web browser (e.g., C or C++) and is a component of the web browser. The checksum compute module is separate from the online application code module. During operation, the checksum compute module receives one or more parameters from the online application code module. The checksum compute module determines a checksum for the online application code module based on the received one or more parameters or based on any other data for the online application code module. The checksum compute module provides the checksum to the online application code module. The online application code module verifies that the online application has not been tampered with based on the checksum, for example, by verifying the checksum based on information received from a server or information stored in a local trusted cache. The checksum can be determined based on any information related to the online application code module, for example, any information used in a cyclic redundancy check (CRC) computation.

As used herein, the term "checksum" encompasses its plain and ordinary meaning including, but not limited to, a value computed based on all or a portion of a data unit to determine whether the data unit is authentic or whether the data unit has errors or was tampered with. The checksum may be computed via a secure hash communication technique, for example, sha256, sha512, or MD5. As a result of using the checksum approach, it may be almost impossible or very difficult to create tampered data that would compute to the same checksum as original untampered data, allowing for tampered data to be detectible by a computing device.

Advantageously, in some aspects of the subject technology, the checksum may be computed quickly (e.g., in 300 milliseconds, one second, or five seconds) using C or C++ code rather than slowly using JavaScript code that is not optimal for computing checksums based on parameters (e.g., multiple bits) or based on any other data for the online application code module. As a result, authenticity of an online application code module residing in local storage (e.g., HTML5 local storage) of a web browser may be verified more quickly and without requiring excessive processing power.

FIG. 1 illustrates an example client computing device 100 configured to compute a checksum for content in local storage.

The client computing device 100 may be a laptop computer, a desktop computer, a mobile phone, a personal digital assistant (PDA), a tablet computer, a netbook, a television with one or more processors embedded therein or coupled thereto, a physical machine, or a virtual machine. The client computing device 100 may include or be coupled with one or more of a keyboard, a mouse, a display, or a touch screen.

As shown, the client computing device 100 includes a central processing unit (CPU) 102, a network interface 104, a bus 105, and a local storage 106. The CPU 102 includes one or more processors. The CPU 102 is configured to execute computer instructions that are stored in a computer-readable medium, for example, the local storage 106. The network interface 104 is configured to allow the client computing device 100 to transmit and receive data in a network, e.g., for communication with a server. The network interface 104 may include one or more network interface cards (NICs). The bus 105 is configured to allow communication between the CPU 102, the network interface 104, the local storage 106. In some aspects, the bus 105 may be configured to also allow communication between other components of the client computing device 100. The bus 105 may be implemented via one or more wired or wireless connections. The local storage 106 stores data or instructions. The local storage 106 may be one or more of a cache unit, a storage unit, an internal storage unit, or an external storage unit. As illustrated, the local storage 106 includes an operating system 107.

The operating system 107 can be any operating system configured to allow software computer program(s) to be executed within the operating system 107. In some aspects, the client computing device 100 has a single operating system 107. In other aspects, the operating system 107 is one of multiple operating systems executing on the client computing device 100. As illustrated, the operating system 107 includes a web browser 108.

The web browser 108 is configured to execute online application(s) (e.g., webpage(s) or components within webpage(s), such as a chat component in an email webpage or social networking webpage or a video component in a newspaper webpage). In some implementations, the web browser 108 may be replaced with another application (e.g., a mobile phone application or tablet computer application, for example, for accessing a social networking service, an online banking program, etc.). The web browser 108 includes an online application delta JavaScript (JS) update module 110, an online application JavaScript code module 112, a checksum compute module 114, and a local storage access module 120.

The online application JavaScript code module 112 is configured to implement an online application (e.g., an online electronic messaging application, an online calendar application, an online mapping application, etc.). The code module 112 resides within a long-term local storage of the web browser 108, e.g., a storage that maintains data and instructions when the web browser 108 is closed or when the client computing device 100 is shut down. The code module 112 is stored in a local storage (e.g., HTML5 local storage) of the web browser 108. As illustrated, the code module 112 is written in JavaScript. However, the code module 112 may be written in any scripting language or any other programming language. In some aspects, the online application JavaScript code module 112 may be replaced with a code module in another scripting language or another programming language, or with a module that includes data that is not software code (e.g., a text file or an image).

When a user first executed the online application corresponding to code module 112 in the web browser 108, a version of code module 112 is downloaded from a server. On subsequent executions, the code module 112 may be updated by downloading, from the server, the online application delta JS update module 110. The update module 110 includes code that may be added to or used to modify the code module 112. For example, if the code module 112 is for an electronic messaging application, the update module 110 may include updated code for the electronic messaging application. The update module 110 is illustrated as a JavaScript module. However, in alternative implementations, the update module 110 may be written in any programming language. The update module 110 and the code module 112 may be written in the same programming language (e.g., both may be written in JavaScript).

The checksum compute module 114 is implemented as a component of the web browser 108 and is written in the same programming language as the web browser 108. For example, the web browser 108 is written in C++ and the checksum compute module 114 is written in C++. The checksum compute module 114 is written in a different programming language than the code module 112. According to some aspects, the checksum compute module 114 is separate from the code module 112 and does not share any code with the code module 112.

The checksum compute module 114 is configured to receive one or more parameters 116 of the code module 112 or any other data for the code module 112, for example, from the code module 112. The checksum compute module 114 is configured to determine a checksum 118 for the code module 112 based on the received parameter(s) 116 or other data. The checksum compute module 114 is configured to provide the checksum 118 to the code module 112. The online application JavaScript code module 112 is configured to verify that the online application JavaScript code module 112 has not been tampered with and, therefore, is authentic, based on the checksum, for example, by verifying the checksum based on information received from the server or information stored in a local trusted cache of the client computing device 100. The server is a web server for executing or updating the online application. As a result of the verification of the authenticity of the code module 112, the server may update the code module 112 (via the update module 110) or allow the code module 114 to receive data from the server to execute via the web browser 108. Alternatively, the checksum compute module 114 can provide the checksum directly to the server so the server can verify the authenticity of the code module 112.

In some aspects, the checksum compute module 114 determines the checksum 118 for the code module 112 in response to writing of data to the long-term local storage of the web browser 108 or in response to downloading, updating, or modifying of the code module 112. In some aspects, the checksum compute module 112 provides the checksum 118 in response to receiving a request to retrieve data from the long-term local storage of the web browser or in response to receiving a request to access or execute the code module 112. The checksum 118 may be stored in the long-term local storage in conjunction with the code module 112, and the web browser 108 may monitor write access to the long-term local storage and invalidate or recompute the checksum 118 in response to a write. As a result, the computational cost (in terms of use of processing resources) of determining the checksum 118 in response to a request to access the code module 112 may be very low.

In some implementations, the checksum compute module 114 resides separately from the web browser 108 and is written in a different programming language than the code module 112.

In some implementations, the subject technology may be implemented with a local application that is not a web browser in place of the web browser 108. In other words, the web browser 108 may be replaced with a local application that is not a web browser.

In some implementations, a module that includes data that is not software code (e.g., an extensible markup language (XML) file) may be used in place of the online application JavaScript code module 112. In other words, the online application JavaScript code module 112 may be replaced with a module that includes data that is not software code.

Figure 2:
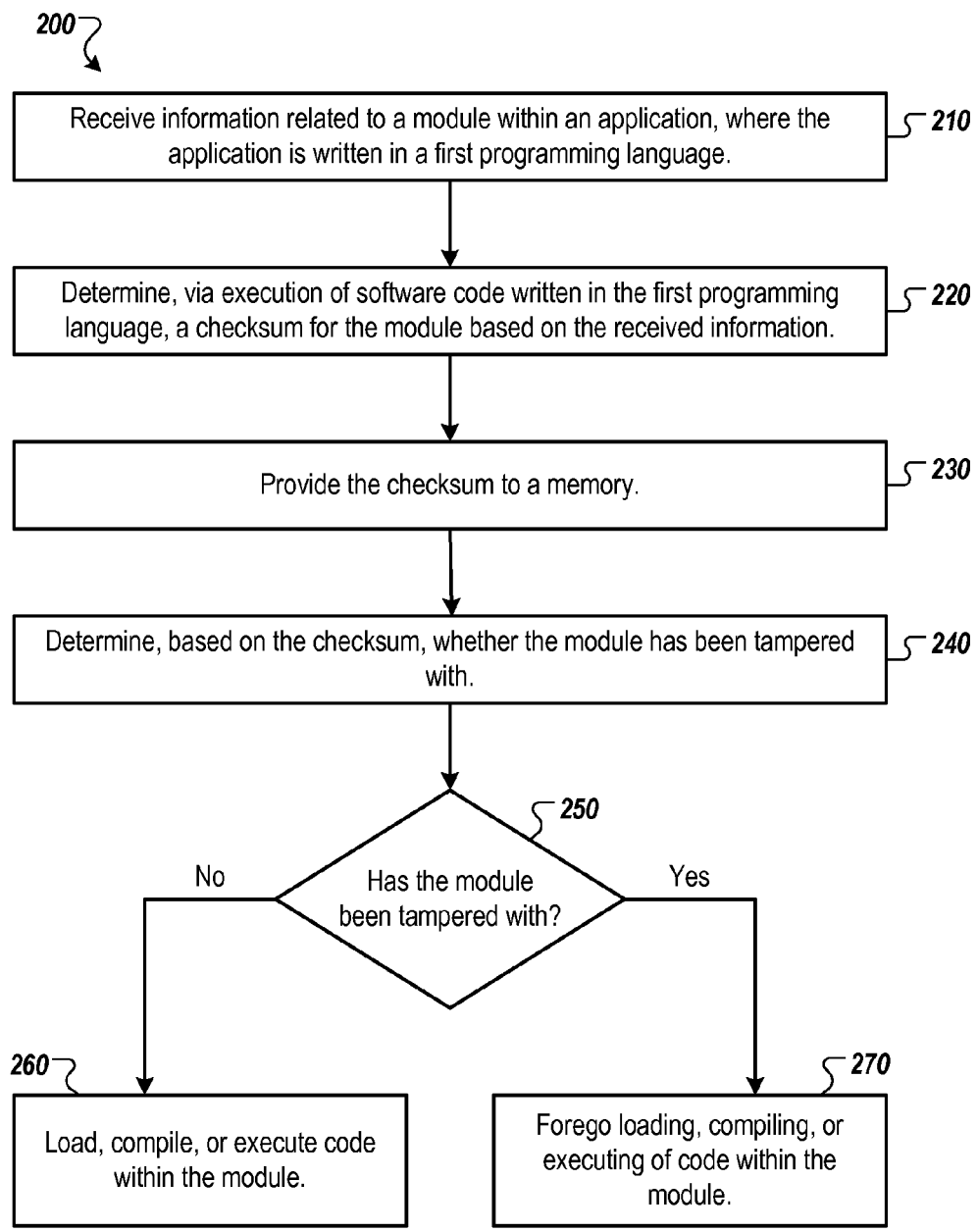
FIG. 2 illustrates an example process by which a checksum for content in local storage may be computed.

FIG. 2 illustrates an example process 200 by which a checksum for content in local storage may be computed.

The process 200 begins at step 210, where a computer (e.g., client computing device 100) receives (e.g., via operation of the checksum compute module 114) information related to a module (e.g., online application JS code module 112), for example, one or more parameters of the module or any other data related to the module. The module resides within an application (e.g., web browser 108). The application is written in a first programming language (e.g., C or C++). The application can be a web browser or any other application. The module can include software code written in a second programming language (e.g., JavaScript) different from the first programming language. Alternatively, the module can include data (e.g., a text file, an image, etc.) that is not software code.

In step 220, the computer determines, via execution of software code (e.g., in the checksum compute module 114) written in the first programming language, a checksum for the module based on the received information, for example, the received one or more parameters or the received data related to the module. The executed software code written in the first programming language may be code of the application (e.g., code stored within the application, as the checksum compute module 114 is stored within the web browser 108). In some aspects, the module resides in a long-term local storage of the application, and the checksum is determined in response to writing of data to the long-term local storage of the application or in response to a request to retrieve data from the long-term local storage of the application.

In step 230, the computer provides the checksum to a memory (e.g., local storage 106). The memory may be a local memory of the computer. In some aspects, the checksum is embedded into a filename for the module for fast and easy access to the checksum by the computer. In some aspects, the module includes software code, and the checksum is provided to the module for processing (e.g., for verifying the authenticity of the module). In some aspects, the computer provides the checksum to the memory in response to receiving a request to access or execute the module.

In step 240, the computer determines, based on the checksum, whether the module has been tampered with. For example, the computer can verify the checksum based on information (e.g., an expected value for the checksum) received from a server or information stored in a local trusted cache. In some aspects, the computer receives, from the server, the expected value for the checksum in conjunction with data (e.g., the online application delta JS update module 110) for updating the module.

In step 250, the computer selects a branch based on whether the module has been tampered with, as determined in step 240. If the module has not been tampered with, the process 200 continues to step 260. If the module has been tampered with, the process 200 continues to step 270.

In step 260, if the module has not been tampered with, the computer loads, compiles, or executes code within the module. In some aspects, all or a portion of the code within the module may be updated based on data or instructions received via the network from the server (e.g., data or instructions stored in the online application delta JS update module 110) before loading, compiling, or executing. In some aspects, all or a portion of the code may not be updated. After step 260, the process 200 ends.

In step 270, if the module has been tampered with, the computer foregoes loading, compiling, or executing code within the module, as the module may contain incorrect or malicious code. Instead, the computer downloads a new, replacement version of the module via the network from the server. After step 270, the process 200 ends.

Figure 3:
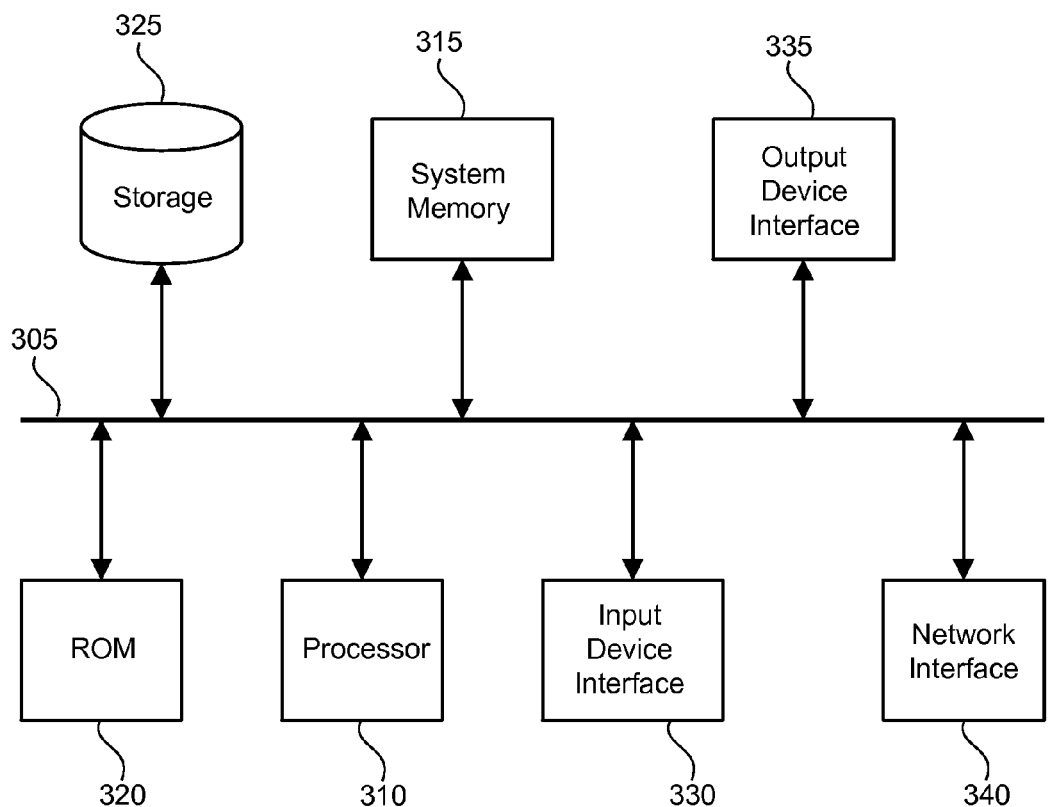
FIG. 3 conceptually illustrates an example electronic system with which some implementations of the subject technology are implemented.

FIG. 3 conceptually illustrates an electronic system 300 with which some implementations of the subject technology are implemented. For example, the client computing device 100 may be implemented using the arrangement of the electronic system 300. The electronic system 300 can be a computer (e.g., a mobile phone, PDA), or any other sort of electronic device. Such an electronic system includes various types of computer readable media and interfaces for various other types of computer readable media. Electronic system 300 includes a bus 305, processing unit(s) 310, a system memory 315, a read-only memory 320, a permanent storage device 325, an input device interface 330, an output device interface 335, and a network interface 340.

The bus 305 collectively represents all system, peripheral, and chipset buses that communicatively connect the numerous internal devices of the electronic system 300. For instance, the bus 305 communicatively connects the processing unit(s) 310 with the read-only memory 320, the system memory 315, and the permanent storage device 325.

From these various memory units, the processing unit(s) 310 retrieves instructions to execute and data to process in order to execute the processes of the subject technology. The processing unit(s) can be a single processor or a multi-core processor in different implementations.

The read-only-memory (ROM) 320 stores static data and instructions that are needed by the processing unit(s) 310 and other modules of the electronic system. The permanent storage device 325, on the other hand, is a read-and-write memory device. This device is a non-volatile memory unit that stores instructions and data even when the electronic system 300 is off. Some implementations of the subject technology use a mass-storage device (for example a magnetic or optical disk and its corresponding disk drive) as the permanent storage device 325.

Other implementations use a removable storage device (for example a floppy disk, flash drive, and its corresponding disk drive) as the permanent storage device 325. Like the permanent storage device 325, the system memory 315 is a read-and-write memory device. However, unlike storage device 325, the system memory 315 is a volatile read-and-write memory, such a random access memory. The system memory 315 stores some of the instructions and data that the processor needs at runtime. In some implementations, the processes of the subject technology are stored in the system memory 315, the permanent storage device 325, or the read-only memory 320. For example, the various memory units include instructions for computing a checksum for content in local storage in accordance with some implementations. From these various memory units, the processing unit(s) 310 retrieves instructions to execute and data to process in order to execute the processes of some implementations.

The bus 305 also connects to the input and output device interfaces 330 and 335. The input device interface 330 enables the user to communicate information and select commands to the electronic system. Input devices used with input device interface 330 include, for example, alphanumeric keyboards and pointing devices (also called "cursor control devices"). Output device interfaces 335 enables, for example, the display of images generated by the electronic system 300. Output devices used with output device interface 335 include, for example, printers and display devices, for example cathode ray tubes (CRT) or liquid crystal displays (LCD). Some implementations include devices for example a touch screen that functions as both input and output devices.

Finally, as shown in FIG. 3, bus 305 also couples electronic system 300 to a network (not shown) through a network interface 340. In this manner, the electronic system 300 can be a part of a network of computers (for example a local area network ("LAN"), a wide area network ("WAN"), or an Intranet, or a network of networks, for example the Internet. Any or all components of electronic system 300 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

What is claimed is:

1. A system for computing a checksum for an online application, the system comprising:
    one or more hardware processors; and
    a machine-readable medium comprising instructions stored therein, which when executed by the processors, cause the processors to perform operations comprising:
        implementing the online application within a web browser on a computing device by an online application code module, wherein the online application is locally stored in the web browser, and
        wherein the online application code module is included in the web browser and the online application code module is written in a first programming language;
        receiving one or more parameters associated with update information for the online application, from the online application code module, at a checksum compute module within the web browser, the checksum compute module being written in a second programming language different from the first programming language, the checksum compute module being separate from the online application code module;

determining, by the checksum compute module, a checksum associated with the online application for the online application code module based on the received parameters;

providing the checksum to a memory associated with the online application code module;

verifying, by the online application code module, the checksum based on information received from a server or information stored in a local trusted cache; and in response to a successful verification,
executing the online application; and in response to an unsuccessful verification,
requesting a new version of the online application code module.

2. The system of claim 1, wherein the first programming language comprises JavaScript.

3. The system of claim 1, wherein the second programming language comprises C or C++.

4. The system of claim 1, wherein the web browser further includes the checksum compute module.

5. The system of claim 4, wherein the web browser is written in the second programming language.

6. The system of claim 1, wherein the checksum compute module is separate from the web browser.

7. The system of claim 1, wherein the online application code module resides within a long-term local storage of the web browser.

8. The system of claim 7, wherein determining the checksum for the online application code module comprises:
determining the checksum for the online application code module in response to writing of data to the long-term local storage of the web browser.

9. The system of claim 7, wherein providing the checksum comprises:
providing the checksum in response to receiving a request to retrieve data from the long-term local storage of the web browser.

10. The system of claim 1, wherein determining the checksum for the online application code module comprises:
determining the checksum for the online application code module in response to downloading, updating or modifying of the online application code module.

11. The system of claim 1, wherein providing the checksum comprises:
providing the checksum in response to receiving a request to access or execute the online application code module.

12. The system of claim 1, wherein the online application comprises an online electronic messaging application.

13. The system of claim 1, wherein providing the checksum comprises:
providing the checksum to the online application code module.

14. A computer-implemented method for computing a checksum, the method comprising:
implementing a software code within an application on a computing device by a first module, wherein the software code is locally stored in the application, and
wherein the first module is included in the application and the first module is written in a first programming language;
receiving one or more parameters associated with update information for the software code, from the first module, at a second module within the application, wherein the application comprises a web browser, wherein the second module is written in a second programming language different from the first programming language, and wherein the second module being separate from the first module;

determining, via the second module, a checksum for the first module based on the received one or more parameters;

providing the checksum to a memory of the computing device, associated with the first module;

verifying the checksum based on information received from a server or information stored in a local trusted cache; and in response to a successful verification,
executing the software code; and in response to an unsuccessful verification,
requesting a new version of the first module.

15. The method of claim 14, wherein the first module comprises data that is not software code.

16. The method of claim 14, further comprising:
determining, based on the checksum, whether the first module has been tampered with.

17. The method of claim 14, wherein providing the checksum to the memory comprises embedding the checksum into a filename for the first module.

18. A non-transitory computer-readable medium comprising instructions which, when executed by a computer, cause the computer to implement a method for computing a checksum, the method comprising:
implementing a software code within an application on a computing device by a first module, wherein the software code is locally stored in the application, and
wherein the first module is included in the application and the first module is written in a first programming language;

receiving one or more parameters associated with update information for the software code, from the first module, at a second module within the application, wherein the application comprises a web browser, and wherein the second module is written in a second programming language different from the first programming language, and wherein the second module is separate from the first module;

determining, via the second module, a checksum for the first module based on the received one or more parameters; and providing the checksum to a memory of the computing device, associated with the first module;

verifying the checksum based on information received from a server or information stored in a local trusted cache; and in response to a successful verification,
executing the software code; and in response to an unsuccessful verification,
requesting a new version of the first module.

* * * * *